(12) United States Patent  
Schofield

(10) Patent No.: US 9,551,156 B1  
(45) Date of Patent: Jan. 24, 2017

(54) PROCESS OF MAKING ARTIFICIAL ROCKS OUT OF EXPENDED PLASTIC BOTTLES AND METAL CANS

(71) Applicant: Janet Schofield, Stafford, TX (US)

(72) Inventor: Janet Schofield, Stafford, TX (US)

( * ) Notice: Subject to any disclaimer, the term of this patent is extended or adjusted under 35 U.S.C. 154(b) by 0 days.

(21) Appl. No.: 15/178,096

(22) Filed: Jun. 9, 2016

Related U.S. Application Data

(60) Provisional application No. 62/180,494, filed on Jun. 16, 2015.

(51) Int. Cl.
| | |
|---|---|
| *B44F 9/04* | (2006.01) |
| *E04F 13/08* | (2006.01) |
| *B29C 35/02* | (2006.01) |
| *B32B 13/00* | (2006.01) |
| *B32B 13/06* | (2006.01) |
| *B32B 13/12* | (2006.01) |
| *B21D 53/00* | (2006.01) |
| *B29L 31/00* | (2006.01) |

(52) U.S. Cl.
CPC .......... *E04F 13/0873* (2013.01); *B21D 53/00* (2013.01); *B29C 35/02* (2013.01); *B32B 13/00* (2013.01); *B32B 13/06* (2013.01); *B32B 13/12* (2013.01); *B44F 9/04* (2013.01); *B29L 2031/722* (2013.01); *B32B 2439/00* (2013.01); *B32B 2439/60* (2013.01); *Y10T 29/4998* (2015.01); *Y10T 29/49716* (2015.01); *Y10T 29/49982* (2015.01)

(58) Field of Classification Search
CPC ......... E04F 13/0873; B44F 9/04; B32B 13/00; B32B 13/06; B32B 13/12; B32B 2439/60; B29C 35/02; B21D 53/00; Y10T 29/49716; Y10T 29/4998; Y10T 29/49982

See application file for complete search history.

(56) References Cited

U.S. PATENT DOCUMENTS

| | | |
|---|---|---|
| 716,371 A | 12/1902 | Black et al. |
| 962,924 A | 6/1910 | Simpson |
| 1,038,115 A | 9/1912 | Gillies et al. |
| 1,746,869 A | 2/1930 | Rosenthal |
| 1,809,329 A | 6/1931 | Bossi et al. |
| 3,379,812 A | 4/1968 | Yakovou |
| 3,836,619 A | 9/1974 | Volent |
| 3,950,477 A | 4/1976 | Di Giacomo |
| 4,033,804 A | 7/1977 | Baldyga |
| 4,331,734 A | 5/1982 | Stegmeier |

(Continued)

*Primary Examiner* — Jermie Cozart

(57) ABSTRACT

A method for converting expended plastic and metal containers into artificial rocks by removing the label from a plastic or metal container, removing the top, stuffing the container with compacted, smaller, expended plastic, beverage bottles, or cleaned, crushed, expended food cans, shaping the filled plastic container by means of a heat gun, or the filled metal container by crimping the ends, burning holes into the filled, shaped plastic container with a soldering iron or drilling holes in the filled shaped metal container with an electric drill. A first layer of wet stucco is troweled onto the shaped container, lightly pressed into the holes, and allowed to dry, whereupon a second layer of stucco is applied over the base layer and allowed to dry, after which a layer of colored cement is applied over the second layer and brushed and rolled while still wet to create different surface textures like those of real rocks and allowed to dry to form the final rock product that looks just like a real rock.

7 Claims, 4 Drawing Sheets

Step 1: Remove the label from a bottle and cut off the top portion of the bottle.

Step 2: Fill the remaining portion of the bottle with compacted, small, plastic bottles, or cleaned, crushed, expended food cans.

Step 3: Apply heat with a heat gun to various spots on the filled plastic bottle to shape the bottle into a rock like shape.

Step 4: Put a plurality of holes into the rock shaped, filled bottle with a hot soldering iron.

Step 5: Apply a first layer of wet stucco with a trowel onto the surface of the filled, rock shaped bottle and lightly press with the trowel so some of the stucco goes into the holes.

Step 6: Allow the first layer of stucco to dry.

Step 7: Apply a second layer of stucco over the first layer and allow it to dry.

Step 8: Apply a layer of colored cement over the second layer and brush or roll it to create a rough surface texture.

Step 9: Allow the layer of colored cement to dry.

(56) References Cited

U.S. PATENT DOCUMENTS

| | | |
|---|---|---|
| 4,354,332 A | 10/1982 | Lentz |
| 4,678,617 A | 7/1987 | Sykes |
| 4,734,302 A | 3/1988 | Baskin |
| 4,884,328 A | 12/1989 | Neighbors |
| 5,167,991 A | 12/1992 | Lowe |
| 5,372,676 A | 12/1994 | Lowe |
| 5,395,577 A | 3/1995 | Gorski |
| 5,543,100 A * | 8/1996 | Kluh ....................... B29C 33/40 264/130 |
| 5,588,196 A | 12/1996 | Samelson |
| 5,597,627 A | 1/1997 | Lindeberg |
| 5,746,037 A | 5/1998 | Nordberg |
| 5,962,095 A | 10/1999 | Beck |
| 6,042,766 A | 3/2000 | Bahr |
| 6,132,820 A | 10/2000 | Callahan |
| 6,416,693 B1 | 7/2002 | Lockwood |
| 6,623,813 B2 | 9/2003 | Hsu |
| 7,115,178 B1 | 10/2006 | Schofield |
| 7,306,757 B2 | 12/2007 | Harrington |
| 7,438,952 B2 | 10/2008 | Connelly et al. |
| 7,736,703 B1 | 6/2010 | Schofield |
| 7,866,019 B1 | 1/2011 | Schofield |
| 7,967,595 B1 | 6/2011 | Schofield |
| 8,101,270 B2 | 1/2012 | Watanabe |
| 8,435,621 B2 | 5/2013 | Aravamudan |
| 8,454,742 B2 | 6/2013 | Scanlan |
| 8,926,873 B2 | 1/2015 | Scanlan |
| 9,034,094 B2 | 5/2015 | Scanlan |
| 2009/0214803 A1* | 8/2009 | Huber ....................... B44C 5/06 428/15 |

* cited by examiner

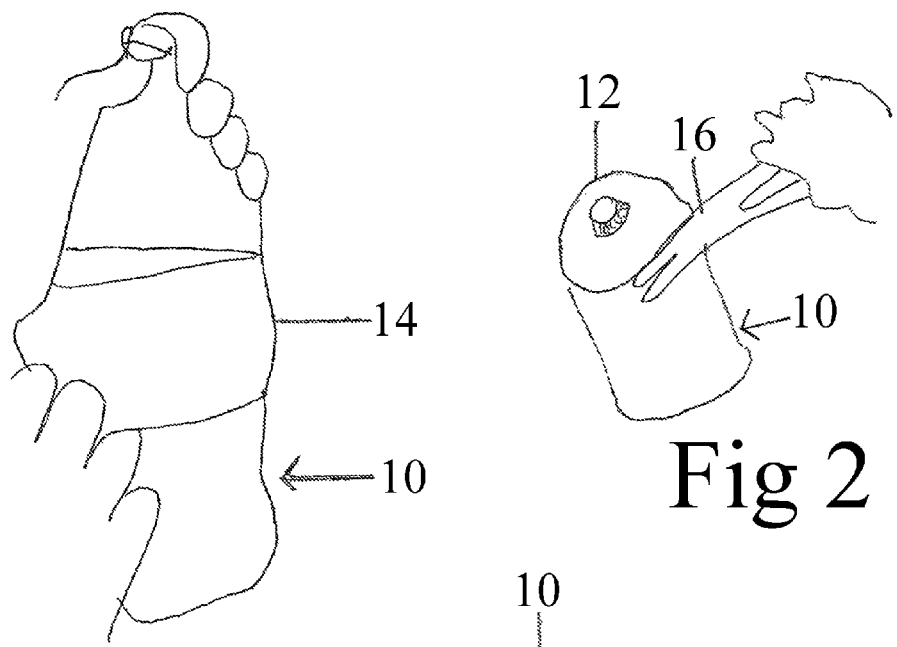
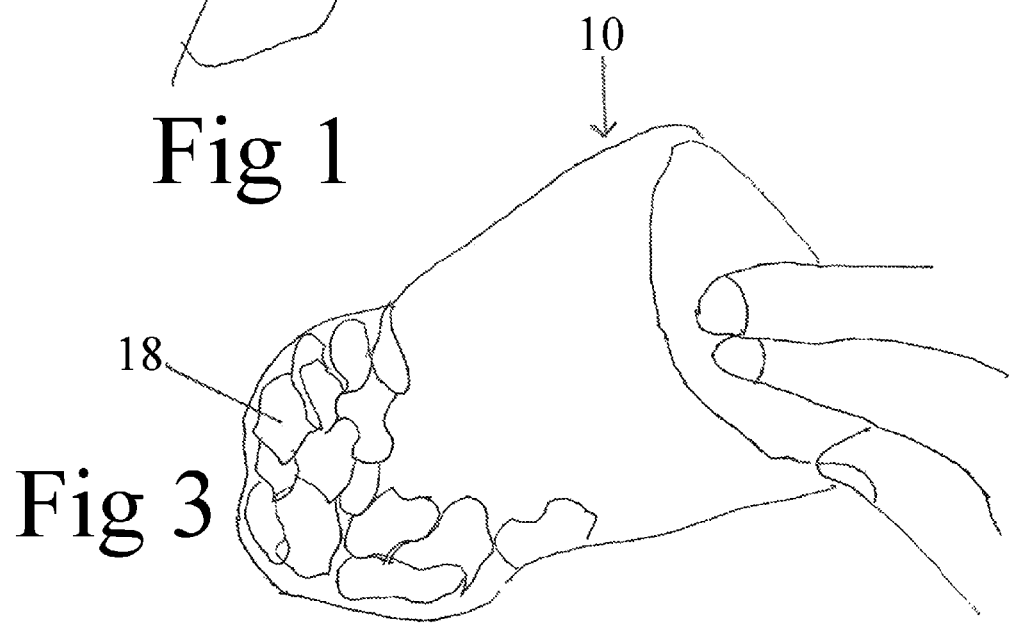
Fig 1
Fig 2
Fig 3

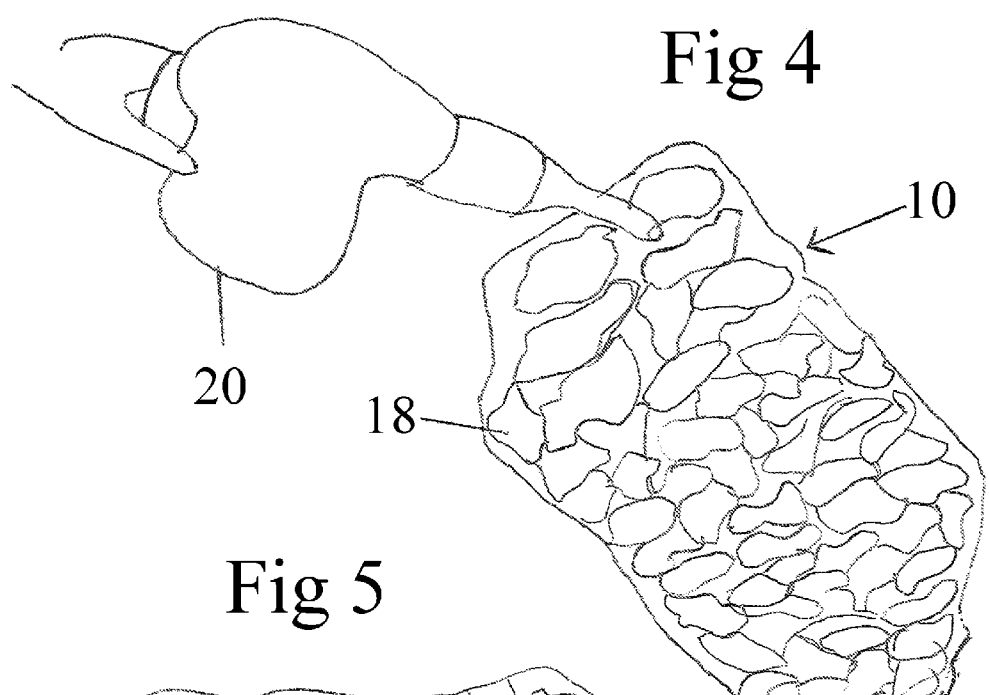
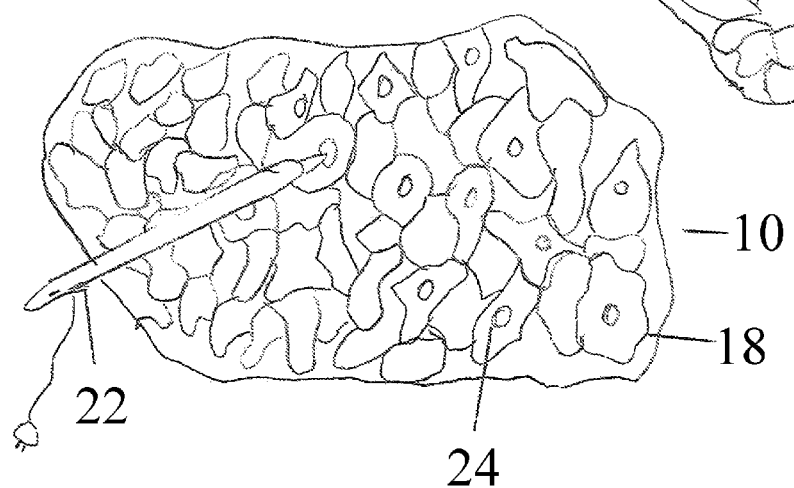

Step 1: Remove the label from a bottle and cut off the top portion of the bottle.

Step 2: Fill the remaining portion of the bottle with compacted, small, plastic bottles, or cleaned, crushed, expended food cans.

Step 3: Apply heat with a heat gun to various spots on the filled plastic bottle to shape the bottle into a rock like shape.

Step 4: Put a plurality of holes into the rock shaped, filled bottle with a hot soldering iron.

Step 5: Apply a first layer of wet stucco with a trowel onto the surface of the filled, rock shaped bottle and lightly press with the trowel so some of the stucco goes into the holes.

Step 6: Allow the first layer of stucco to dry.

Step 7: Apply a second layer of stucco over the first layer and allow it to dry.

Step 8: Apply a layer of colored cement over the second layer and brush or roll it to create a rough surface texture.

Step 9: Allow the layer of colored cement to dry.

Fig 8

PROCESS OF MAKING ARTIFICIAL ROCKS OUT OF EXPENDED PLASTIC BOTTLES AND METAL CANS

CROSS-REFERENCE TO RELATED APPLICATIONS

This application claims the benefit of provisional patent application Ser. No. 62/180,494 filed Jun. 16, 2015 by the present inventor.

FEDERALLY SPONSORED RESEARCH

Not Applicable

SEQUENCE LISTING OR PROGRAM

Not Applicable

BACKGROUND OF THE INVENTION

Field of the Invention

This invention generally relates to a method for producing artificial rocks, specifically from expended plastic containers and expended metal cans.

Prior Art

One of the serious problems confronting society today is the generation of waste. Millions of thermoplastic and metal containers are produced each year, used once, and thrown away. Landfilling is the primary method of waste disposal, but it appears that landfills throughout the world are rapidly filling up. Discarded plastic and metal containers are non-biodegradable, and so add to the landfill and environmental problem, as they fill up an ever decreasing landfill space.

The present invention enables the conversion of such used containers into articles of renewed utility and thus enables an economically sound solution to the problem of waste disposal while at the same time providing a valued new product, specifically an economical, artificial rock.

When these rocks are installed on a substrate and mortar is put between them, they look like real rocks, with differing elevation out from the substrate, and different shades, shapes, textures and sizes. This is completely different from mold formed, uniform rocks that look like they came from a cookie cutter. The artificial rocks can also be used as stand-alone rocks for gardens, lawns, yards, and many other uses where artificial rocks are desired. In addition, the artificial rocks produced by this invention can be filled with non-organic trash, such as empty plastic bottles and empty cans, thus further helping to alleviate the waste disposal, environmental problem.

Prior art discloses various attempts to recycle used materials and to make artificial rocks from various materials, including concrete, plastic, steel, and aluminum, but many of the rocks produced by these methods look like they come from a cookie cutter. Also, usually they require bonding agents and molds in their process.

U.S. Pat. No. 7,115,178 B1 (2006), to Schofield, (the present inventor), proposes a process to convert empty, plastic bottles into artificial rocks by using heat to make the bottle malleable, and actual rocks to shape the bottles into rock like shapes. The process further requires a bonding agent to bond the texturing cement to the rock shaped, plastic bottle. The present invention does not require actual rocks to achieve the different rock shapes and does not need a bonding agent or a special machine, and it provides even more recycling possibilities, because the empty, plastic bottle or aluminum or other metal can, can be used in the invention if filled with empty, compacted, plastic bottles or empty used cans.

U.S. Pat. No. 4,678,617 (1987), to Sykes proposes converting two-liter soda bottles into building blocks. This produces a cookie cutter effect, as all the objects are the same size and shape. This process only uses, and so is limited to, soda bottles. Also, this process would not be suitable for producing artificial rocks, which would need to be of different shapes and sizes to appear real.

U.S. Pat. No. 5,588,196 (1996), to Samuelson proposes to recycle a plastic, soda bottle into a container for articles, by means of cuts and flaps. Though this addresses recycling of the plastic bottle without melting or crushing, it does not convert the bottle into a rock as per the invention of this application.

U.S. Pat. No. 5,020,175 (1991), to Kirkpatrick proposes to use expended, plastic, beverage bottles to form cushions, which, which could be used for various purposes. It addresses recycling, but not artificial rocks.

U.S. Pat. No. 4,043,826 (1977), to Hum proposes a lightweight, cement rock colored with cement dyes or pigments. This uses a mold which must be made first. The present invention uses the empty, plastic container or cylindrical can as the mold. Also, the Hum invention does not address recycling.

U.S. Pat. No. 6,132,820 (2000), to Callahan shows a rock made of cement and polystyrene poured into a mold. Again, a mold must be prepared first. The polystyrene used is a waste product, but comprises only a small portion of the rock, so the rock materials are not primarily recycled.

U.S. Pat. No. 4,884,328 (1989), to Neighbors proposes making a decorative item from an aluminum can by means of grooves and pressing. Again, though this addresses using the can itself for the decorative article, it does not convert the can into a rock, as does the present invention.

U.S. Pat. No. 1,746,869 (1930), to Rosenthal proposes making sheet metal flowerpots from cylindrical tin-plate cans by means of crimping and deforming the can. This does address recycling the cans, but it converts the can to a flowerpot, and not a rock, as does the present invention.

The present inventor could find no reference in the prior art where holes put into a mold or object were used as a means to anchor the stucco or cement to the surface of the object, thus eliminating the need for a bonding agent.

OBJECTS AND ADVANTAGES

Accordingly, several objects and advantages of my invention are to convert used, thermoplastic containers, specifically plastic bottles, and used metal cans into artificial rocks that look exactly like real rocks, but are a fraction of the cost of real rocks, are easy to make, and require no expensive equipment.

Another object is to do a great service to the environment by providing for the recycling of previously wasted, non-biodegradable, plastic bottles and metal cans that take up limited landfill space.

A further object is to make the artificial rocks of the invention have different shapes, depths, sizes, and colors, just like real rocks. Thus, these artificial rocks can be used for many non-structural uses, including, but not limited to, waterfalls, lily ponds, garden planters, home wall coverings, rock-stands for mailboxes, rock-covered fence posts, fountains and numerous other items.

This invention can be made up as a portable waterfall unit with locking casters, which would be able to be used in any building without having to build a special foundation. This portable unit would be especially practical and economical for use in commercial and residential buildings that are located in earthquake prone areas, thus saving the cost of very expensive foundations that would be required for a real masonry rock waterfall. A rock waterfall made with these plastic or metal rocks requires no foundation.

Still further objects of this invention are that the rocks are easy to construct and require no special machine of expensive equipment.

Further objects and advantages will become apparent from the ensuing description and drawings.

SUMMARY

The present invention pertains to a process for converting expended plastic and metal containers, specifically plastic bottles and metal cans of many shapes and sizes into new and useful articles, specifically artificial rocks.

In accordance, the method comprises removing the label from a cleaned, expended, plastic bottle or metal can and cutting the top off. The cut-off top can now be recycled, if desired. The container is then filled with compacted, small, expended, plastic, beverage bottles, or cleaned, crushed, expended food cans. Heat is applied by means of a heat gun to various spots on the filled container, if plastic, to shape the container into a rock like shape. If the filled container is metal, the end is crimped together. Small holes are burned into the filled plastic container with a soldering iron, or drilled into the metal container with an electric drill. A suggested diameter of the holes are about ¼". The diameter of the holes can be slightly smaller or larger, depending on the size of the stuffed container.

A rich, wet, stucco mixture of sand, cement, and lime is troweled onto the container and lightly pressed into the holes. When the first layer of stucco dries, some of the stucco that was pressed into the holes acts as an anchor to bond the stucco to the surface of the container. Thus, no separate bonding agent is required.

After the first layer of stucco has dried, a second layer of stucco is applied over the first layer and allowed to dry.

After the second layer of stucco had dried, a colored cement layer is applied over the second stucco layer. This colored layer, while still wet, can now be brushed with a paint brush and stippled with a small paint roller to create different surface textures on the artificial rock just like real rocks have. Because the cement in this layer is already colored, the color goes all the way through the layer and no paint or stain is needed.

After the colored cement layer has dried, the artificial rocks can now be attached to any substrate using a mixture of sand and cement, just like real rocks or placed as free-standing rocks to enhance any landscaping in lawns, yards, and gardens.

BRIEF DESCRIPTION OF THE DRAWINGS

FIG. 1 shows a plastic bottle with the label being removed.

FIG. 2 shows the top portion of the bottle being cut off.

FIG. 3 shows the remaining portion of the bottle being filled with crushed, small, plastic bottles.

FIG. 4 shows heat being applied by means of a heat gun to the filled, plastic bottle.

FIG. 5 shows holes being put into the surface of the shaped, filled plastic bottle by means of a soldering iron.

FIG. 8 is a flowchart showing in a general way the steps of the new process of making artificial rocks.

Figure 6:
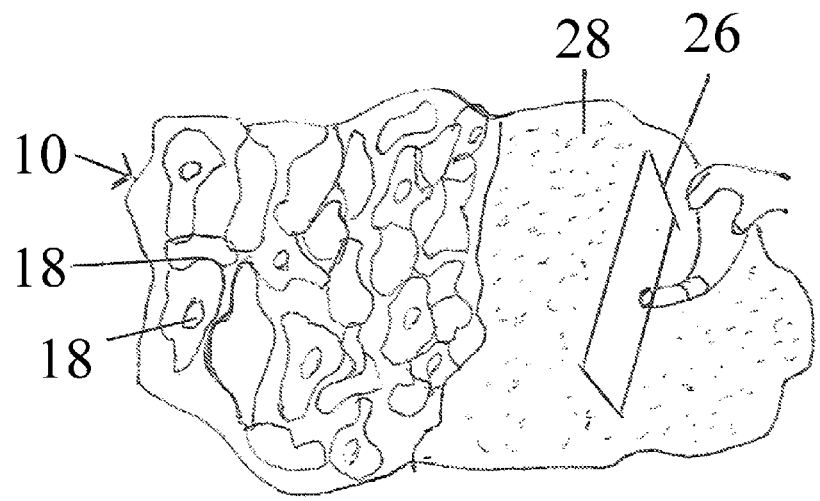
FIG. 6 shows the filled, shaped, plastic bottle with holes in it being covered with stucco by means of a trowel.

DETAILED DESCRIPTION ACCORDING TO THE PREFERRED EMBODIMENTS OF THE PRESENT INVENTION

FIG. 1 shows a label 14 being removed from a two liter plastic soda bottle 10. In this embodiment a two liter bottle is shown, but plastic bottles of various shapes and sizes, including, but not limited to, three liter plastic soda bottles, half gallon and gallon plastic beverage bottles can also be used. Cylindrical, expended, metal food and beverage cans, (not shown), can also be used.

FIG. 2 shows the top portion 12 of the bottle 10 of FIG. 1 being removed with a tin snips 16. This embodiment shows a tin snips, but other cutting implements, such as a utility knife or a sharp scissors can also be used.

FIG. 3 shows the bottom portion of the bottle 10 of FIG. 2 being filled with crushed plastic bottles 18. Cleaned, crushed expended food and beverage cans, (not shown), can also be used as the filling.

FIG. 4 shows the filled bottle 10 being shaped into a rock-like shape by means of a heat gun 20 applying heat to various portions of the filled bottle 10. If a metal container is used, (not shown in the figures), the shaping is done by crimping the ends together and applying pressure by hand.

FIG. 5 shows holes 24 being put into the filled rock-like shaped bottle 10 of FIG. 4 by means of a soldering iron 22. In this embodiment, a plastic bottle is shown as the basis for the artificial rock. However, if a metal can is used as the basis, the holes can be put in using an electric drill. This was not shown in these preferred embodiment figures, but is another embodiment of the invention.

FIG. 6 shows the hole-infused, rock-like shaped bottle 10 of FIG. 5 being coated with wet stucco 28 using a trowel 26.

Figure 7:
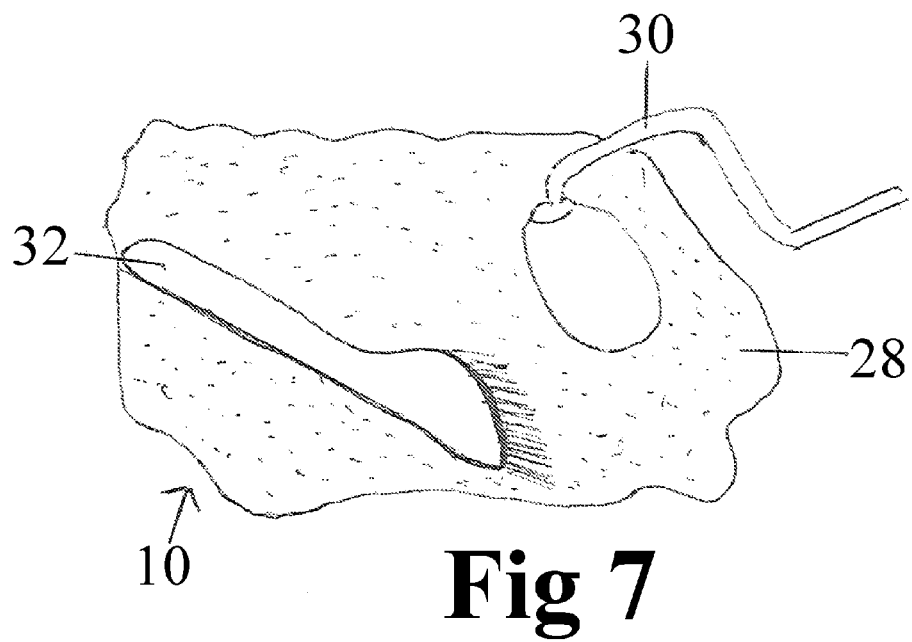
FIG. 7 shows the wet stucco layer being brushed with a paintbrush and stippled with a small paint roller.

FIG. 7 shows the wet stucco coating 28 on the hole-infused, rock-like shaped, filled bottle of FIG. 6 being brushed with a paintbrush 32 and rolled with a paint roller 28 to a rough and rock-like surface texture.

FIG. 8 shows the steps of the method of making the artificial rocks.

Step 1. To prepare a bottle for processing remove the label and cut the top portion of the bottle off.

Step 2. Fill the remaining portion of the bottle of Step 1 with compacted, small, plastic bottles, or cleaned, crushed, expended food cans.

Step 3. Apply heat with a heat gun to multiple spots on the filled bottle of Step 2 to shape it into a rock-like shape.

Step 4. Put a plurality of holes into the shaped bottle of step 3 by means of a soldering iron.

Step 5. Trowel a layer of wet stucco onto the filled, shaped, hole-infused bottle of Step 4.

Step 6. Allow the stucco to dry.

Step 7. Apply a second layer of wet stucco over the dried stucco layer of Steps 5 and 6 and allow it to dry.

Step 8. Apply a layer of colored cement over the second, dried stucco layer and brush it and roll it to create a rough surface texture.

Step 9. Allow the layer of colored cement to dry.

It is to be understood that the present invention is not limited to the embodiments discussed above. Since numerous modifications and changes will readily occur to those skilled in the art, it is not desired to limit the invention to the exact construction and operation shown and described and accordingly, all suitable modifications and equivalents may be resorted to, falling within the scope of the invention.

I claim:

1. A method of converting an expended plastic or metal container into an artificial rock by:
    (a) Removing the label from the container,
    (b) cutting off the top of the container,
    (c) filling the container with non-organic waste materials,
    (d) using a heat source to shape the container, if plastic, into a rock type shape,
    (e) putting a plurality of holes into the surface of the container,
    (f) covering the container with a layer of wet stucco,
    (g) lightly pressing the wet stucco so that some of the stucco goes into the holes,
    (h) allowing the stucco to dry,
    (i) applying a second layer of stucco over the first layer and allowing said second stucco layer to dry,
    (j) applying a layer of colored cement over said second layer and allowing said colored cement layer to dry.

2. A method as claimed in claim 1 where the non-organic waste materials are selected from the group consisting of compacted plastic bottles, cut up plastic bottles, or crushed, expended metal food cans.

3. A method as claimed in claim 1 where the heat source is a heat gun.

4. A method as claimed in claim 1 where the plurality of holes is put into the surface of the filled, rock type shaped plastic container by use of a soldering iron.

5. A method as claimed in claim 1 where the holes are punched in the filled metal container by use of a drill.

6. A method as claimed in claim 1 where the wet layer of colored cement is brushed by use of a paintbrush to create different surface, rock type textures.

7. A method as claimed in claim 1 where the wet layer of colored cement is rolled by use of a paint roller to create different surface, rock type textures.

* * * * *